United States Patent
Wang et al.

(10) Patent No.: US 8,326,933 B2
(45) Date of Patent: Dec. 4, 2012

(54) APPEARANCE PACKAGE MANAGEMENT METHOD, SYSTEM AND DEVICE

(75) Inventors: Rui Wang, Shenzhen (CN); Haitao Liu, Shenzhen (CN); Hui Zhao, Shenzhen (CN); Yue Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 12/762,764

(22) Filed: Apr. 19, 2010

(65) Prior Publication Data

US 2010/0205266 A1  Aug. 12, 2010

Related U.S. Application Data

(63) Continuation of application No. PCT/CN2008/072667, filed on Oct. 13, 2008.

(30) Foreign Application Priority Data

Oct. 19, 2007 (CN) .......................... 2007 1 0165015

(51) Int. Cl.
*G06F 15/16* (2006.01)
(52) U.S. Cl. ............ 709/206; 709/222; 455/38; 455/500
(58) Field of Classification Search .................. 709/206, 709/222; 455/38, 500
See application file for complete search history.

(56) References Cited

U.S. PATENT DOCUMENTS

| | | | |
|---|---|---|---|
| 6,938,079 B1 * | 8/2005 | Anderson et al. | 709/222 |
| 7,099,870 B2 * | 8/2006 | Hsu et al. | 1/1 |
| 7,546,949 B1 * | 6/2009 | Blanford | 235/462.07 |
| 7,610,352 B2 * | 10/2009 | AlHusseini et al. | 709/217 |
| 7,631,260 B1 * | 12/2009 | Riggs et al. | 715/716 |
| 7,765,494 B2 * | 7/2010 | Brunswig et al. | 715/853 |
| 7,884,472 B2 * | 2/2011 | Chen et al. | 257/737 |
| 2003/0025730 A1 | 2/2003 | Brennan | |
| 2003/0212629 A1 * | 11/2003 | King | 705/39 |

(Continued)

FOREIGN PATENT DOCUMENTS

CN  1786938 A  6/2006

(Continued)

OTHER PUBLICATIONS

International Search Report issued in corresponding PCT Application No. PCT/CN2008/072667; mailed Jan. 22, 2009.

(Continued)

*Primary Examiner* — Tesfay Yohannes
(74) *Attorney, Agent, or Firm* — Brinks Hofer Gilson & Lione

(57) ABSTRACT

An appearance package management method is provided, which includes the following steps. An appearance package is received, and a unique appearance package identifier (ID) of the appearance package is obtained. A corresponding relation between the appearance package and the appearance package ID is stored. An operation message of an appearance package is received, and an appearance package corresponding to an appearance package ID obtained from the operation message is operated according to the appearance package ID obtained from the operation message and the stored corresponding relation between the appearance package and the appearance package ID. An appearance package management system and an appearance package management device are also provided. Through the method, the unique ID for the appearance package is established between the server and the terminal, so that the terminal can identify the object of the operation instruction delivered by the server and manage the corresponding appearance package.

11 Claims, 5 Drawing Sheets

U.S. PATENT DOCUMENTS

| | | | |
|---|---|---|---|
| 2004/0216054 A1 | 10/2004 | Mathews et al. | |
| 2006/0122718 A1 | 6/2006 | Fujii et al. | |
| 2006/0199599 A1 | 9/2006 | Gupta et al. | |
| 2006/0227636 A1* | 10/2006 | Walker et al. | 365/201 |
| 2007/0061488 A1* | 3/2007 | Alagappan et al. | 709/246 |
| 2007/0067451 A1* | 3/2007 | Oshiba | 709/224 |
| 2007/0112627 A1* | 5/2007 | Jacobs et al. | 705/14 |
| 2007/0112673 A1* | 5/2007 | Protti | 705/44 |
| 2007/0180400 A1* | 8/2007 | Zotov et al. | 715/788 |
| 2007/0248313 A1* | 10/2007 | Kageyama | 386/55 |
| 2008/0027997 A1* | 1/2008 | Monroe | 707/200 |
| 2008/0133032 A1* | 6/2008 | Arima et al. | 700/79 |
| 2008/0184151 A1* | 7/2008 | Agarwal et al. | 715/772 |
| 2009/0148133 A1* | 6/2009 | Nomura et al. | 386/124 |

FOREIGN PATENT DOCUMENTS

| | | |
|---|---|---|
| WO | 01/82065 A2 | 11/2001 |
| WO | 03/107216 A2 | 12/2003 |
| WO | WO 2004003801 A1 | 1/2004 |

OTHER PUBLICATIONS

Office Action issued in corresponding Chinese Patent Application No. 200710165015.3, mailed Sep. 25, 2009.

Written Opinion of the International Searching Authority issued in corresponding PCT Patent Application No. PCT/CN2008/072667, mailed Jan. 22, 2009.

Extended European Search Report issued in corresponding European Patent Application No. 08842390.0, mailed Feb. 11, 2011.

* cited by examiner

APPEARANCE PACKAGE MANAGEMENT METHOD, SYSTEM AND DEVICE

CROSS-REFERENCE TO RELATED APPLICATIONS

This application is a continuation of International Patent Application No. PCT/CN2008/072667, filed on Oct. 13, 2008, which claims priority to Chinese Patent Application No. 200710165015.3, filed with the Chinese Patent Office on Oct. 19, 2007, both of which are incorporated herein by reference in their entireties.

FIELD OF THE TECHNOLOGY

The present invention relates to the field of communication technologies, and more particularly to an appearance package management method, an appearance package management system, and an appearance package management device.

BACKGROUND OF THE INVENTION

With the rapid development of wireless communication applications, terminals have become an indispensable tool in people's daily life, and the requirements for the appearances of the terminals also become increasingly high. A service provider (SP) hopes to provide appearance packages in various styles for users, so that the users are enabled to display personalized terminal appearance. A terminal appearance refers to contents presented by a terminal to the users such as background, ringing tone, and menu, which are individually referred to as appearance elements. When a plurality of appearance elements is provided to the terminal or operated through the terminal, a collection of the elements is referred to as an appearance package.

Meanwhile, the SP hopes to manage the appearance packages on terminals over network, so as to ensure the benefits of the users and the SP. Management operations of an appearance package on a terminal include delivery, installation, activation/deactivation, update, deletion, and locking/unlocking of the appearance package. Specifically, the delivery operation means sending the appearance package; the installation operation means that the terminal installs the received appearance package, so as to generate a new appearance package; the activation operation means enabling a particular appearance package to become an appearance package currently used by the terminal; the update operation means updating contents in the received appearance package to the existing appearance package; the deletion operation means deleting the particular appearance package stored by the terminal; and the locking/unlocking operation means locking the appearance package against modification, and releasing the locked appearance package.

When the appearance customization service of the user is provided by one SP, the SP can assign serial numbers to the appearance packages in a unified manner, so that no conflict occurs when a server initiates operations on the appearance packages. However, if the appearance customization service of the user is provided by a plurality of SPs, and identical contents may be repeatedly provided, conflicts may occur when the appearance packages are operated. For example, an SP1 initiates an operation to delete an appearance package, and the terminal performs the operation but deletes an appearance package provided by an SP2, resulting in poor appearance management.

In order to solve the problem, the server needs to confirm the appearance packages with the terminal before initiating the operations. In the prior art, a method for managing terminal appearance based on operation/management/authorization-device management (OMA-DM) is provided. In the method, a server based on the OMA-DM technology serves as a manager, and sends a command for operating a certain appearance package, and a client based on the OMA-DM technology executes the command. In the method, the identification of the appearance package is implemented by the terminal. Each time when the server delivers a new appearance package, the terminal assigns a serial number to the appearance package, and returns the serial number to the server, and the server records the serial number; when the server needs to operate the appearance package, the server delivers the serial number of the appearance package along with the command, so that the terminal can correctly operate the appearance package.

During the implementation of the present invention, the inventor found that the prior art at least has the following problems.

The OMA-DM is merely an optional technical solution for appearance management, and in most cases, appearance management is not based on the OMA-DM technology, so that the server cannot record the serial number of each appearance package for each terminal, which is also not feasible in the DM mode, but instead, the server generally obtains a serial number of a target appearance package by query. As a result, a lot of resources are consumed by the server in obtaining information about the appearance package of the terminal.

SUMMARY OF THE INVENTION

Accordingly, the present invention is directed to an appearance package management method, an appearance package management system, and an appearance package management device, which are applicable to establish a unique identifier (ID) for an appearance package between a server and a terminal, so that the server can manage the appearance package of the terminal.

To achieve the above objectives, in an embodiment, the present invention provides an appearance package management method, which includes the following steps.

An appearance package is received, and a unique appearance package ID of the appearance package is obtained.

A corresponding relation between the appearance package and the appearance package ID is stored.

An operation message of an appearance package is received, and an appearance package corresponding to an appearance package ID obtained from the operation message is operated according to the appearance package ID obtained from the operation message and the stored corresponding relation between the appearance package and the appearance package ID.

In an embodiment, the present invention further provides a server configured to manage an appearance package sent to a terminal, which includes an appearance package delivery unit, an operation message delivery unit, and an appearance package ID generation unit.

The appearance package delivery unit is configured to deliver an appearance package to the terminal.

The operation message delivery unit is configured to deliver an operation message to the terminal.

The appearance package ID generation unit is configured to generate a unique appearance package ID, and add the appearance package ID to the appearance package delivered by the appearance package delivery unit, and/or to the operation message delivered by the operation message delivery unit.

In an embodiment, the present invention further provides a terminal configured to manage an appearance package thereof, which includes an appearance package ID obtaining unit, a corresponding relation storage unit, and an appearance package operation unit.

The appearance package ID obtaining unit is configured to obtain a unique appearance package ID of an appearance package sent by a server, and obtain an appearance package ID from an operation message sent by the server.

The corresponding relation storage unit is configured to store a corresponding relation between the appearance package and the appearance package ID according to the appearance package ID obtained by the appearance package ID obtaining unit.

The appearance package operation unit is configured to operate an appearance package corresponding to the appearance package ID obtained by the appearance package ID obtaining unit from the operation message sent by the server according to the corresponding relation between the appearance package and the appearance package ID stored in the corresponding relation storage unit.

In an embodiment, the present invention further provides an appearance package management system, which includes a server and a terminal.

The server is configured to deliver an appearance package and an operation message of an appearance package to the terminal.

The terminal is configured to obtain a unique appearance package ID of the appearance package delivered by the server, store a corresponding relation between the appearance package and the appearance package ID, receive the operation message initiated by the server, and operate an appearance package corresponding to an appearance package ID obtained from the operation message according to the appearance package ID obtained from the operation message and the stored corresponding relation between the appearance package and the appearance package ID.

Compared with the prior art, the present invention at least has the following advantages.

Through the method provided in the present invention, the unique ID for the appearance package is established between the server and the terminal, so that the terminal can identify the object of the operation instruction delivered by the server and manage the corresponding appearance package.

DETAILED DESCRIPTION OF THE EMBODIMENTS

The implementation of the present invention is further illustrated below with reference to the accompanying drawings and embodiments.

Figure 1:
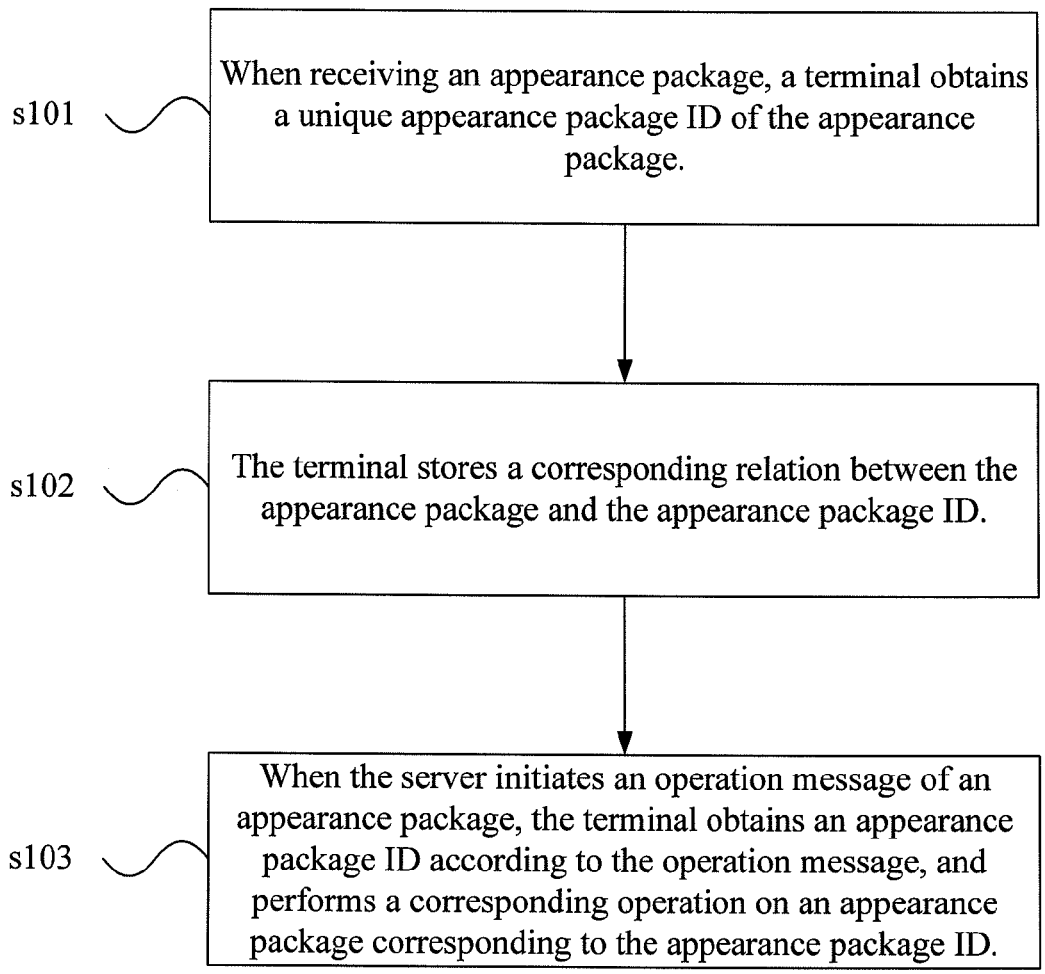
FIG. 1 is a flow chart of an appearance package management method according to a first embodiment of the present invention.

As shown in FIG. 1, an appearance package management method of the present invention includes the following steps.

In step s101, when receiving an appearance package, a terminal obtains a unique appearance package ID of the appearance package.

In this embodiment of the present invention, the appearance package ID at least includes two parts, namely, an ID of an SP and an appearance package serial number. The ID of an SP is a serial number for an SP, which may be assigned by the terminal or by the SP. The appearance package serial number is assigned by the SP. When the ID of the SP and the appearance package serial number are both used, they can uniquely identify any appearance package.

In this embodiment of the present invention, the available appearance package IDs include:

(1) Globally Unique Number Range+Appearance Package Serial Number Assigned by the SP The above mode requires a unified agency to assign a number range to each SP, so that a number range can uniquely identify one SP. For example, as for currently used physical addresses for network devices, a specialized agency assigns physical addresses in one number range to each network device manufacturer, and the network device manufacturer assigns a physical address to each device within the number range, thereby ensuring that the physical address is globally unique. For another example, every province has a unique ID for license plates on automobiles, for example, Jing for Beijing and Yue for Guangdong, and then subsequent serial numbers are used to identify different regions and counties, so as to ensure that the license plate numbers are unique across the whole country.

(2) Domain Name of the SP+Appearance Package Serial Number Assigned by the SP

Every SP has a domain name, and both a terminal and a server can use the domain name. For example, in an appearance package ID, lfc_www.cmcc.com.cn_10001, lfc indicates that this is an appearance package; www.cmcc.com.cn is a domain name used by China Mobile, indicating that the appearance package is provided by China Mobile; and 10001 is an appearance package serial number assigned by China Mobile to the appearance package. The ID can uniquely identify an appearance package.

(3) Download Path for Obtaining the Appearance Package from the SP

Considering that different appearance packages have different download paths, a download path of an appearance package can be taken as an ID of the appearance package. For example, if a download path of an appearance package is www.cmcc.com.cn/download/lfc/10001, the path can be taken as an appearance package ID of the appearance package, in which 10001 is an appearance package serial number assigned by China Mobile to the appearance package, indicating that the appearance package is obtained from download resources provided by China Mobile and has a serial number of 10001.

Several optional manners for identifying appearance packages have been described above, but the protection scope of the present invention is not limited here, and other similar manners are not enumerated one by one herein. With such a manner, all devices can identify an appearance package uniquely by using an appearance package ID thereof. The appearance package ID may be generated by the server, and in this case, the server adds the appearance package ID to an appearance package to be delivered, so that the terminal obtains the appearance package ID from the appearance package delivered by the server. If the appearance package ID is generated by the terminal, the terminal may identify the appearance package ID according to the manner described in (2) or (3).

In step s102, the terminal stores a corresponding relation between the appearance package and the appearance package ID.

Upon receiving an appearance package and obtaining an appearance package ID of the appearance package, the terminal establishes a corresponding relation between the appearance package and the appearance package ID, and locally stores the corresponding relation. Specifically, the corresponding relation between the appearance package and the appearance package ID may be established by the following three manners.

(1) When the terminal receives an appearance package containing an appearance package ID, the terminal stores the appearance package; and then when the terminal receives an operation instruction for an appearance package, the terminal parses each appearance package stored therein to obtain an ID of each appearance package, so as to find out an object of the operation.

(2) When receiving an appearance package, the terminal parses the appearance package to obtain an appearance package ID and appearance package contents, and establishes a corresponding relation between the appearance package and the appearance package ID, for example, creates a table to record a corresponding relation between appearance package IDs and appearance package storage paths, as shown in Table 1 below.

TABLE 1

Corresponding Relation Between Appearance Package IDs and Appearance Package Storage Paths

| No. | Appearance Package ID | Appearance Package Storage Path |
|---|---|---|
| 1 | lfc__www.cmcc.com.cn__10001 | C:\LFC\P1 |
| ... | ... | ... |

(3) The terminal establishes a relation between the appearance package and the appearance package ID by using file directories.

For example, the appearance package contents contained in the appearance package are stored in a directory named after the appearance package ID: c:\LFC\ lfc_www.cmcc.com.cn__10001. When the terminal receives an operation instruction for an appearance package, the terminal may find out an object of the operation by looking up the table or directly reading the directory.

In step s103, when the server initiates an operation message of an appearance package, the terminal obtains an appearance package ID according to the received operation message, and performs a corresponding operation on an appearance package corresponding to the appearance package ID.

Figure 2:
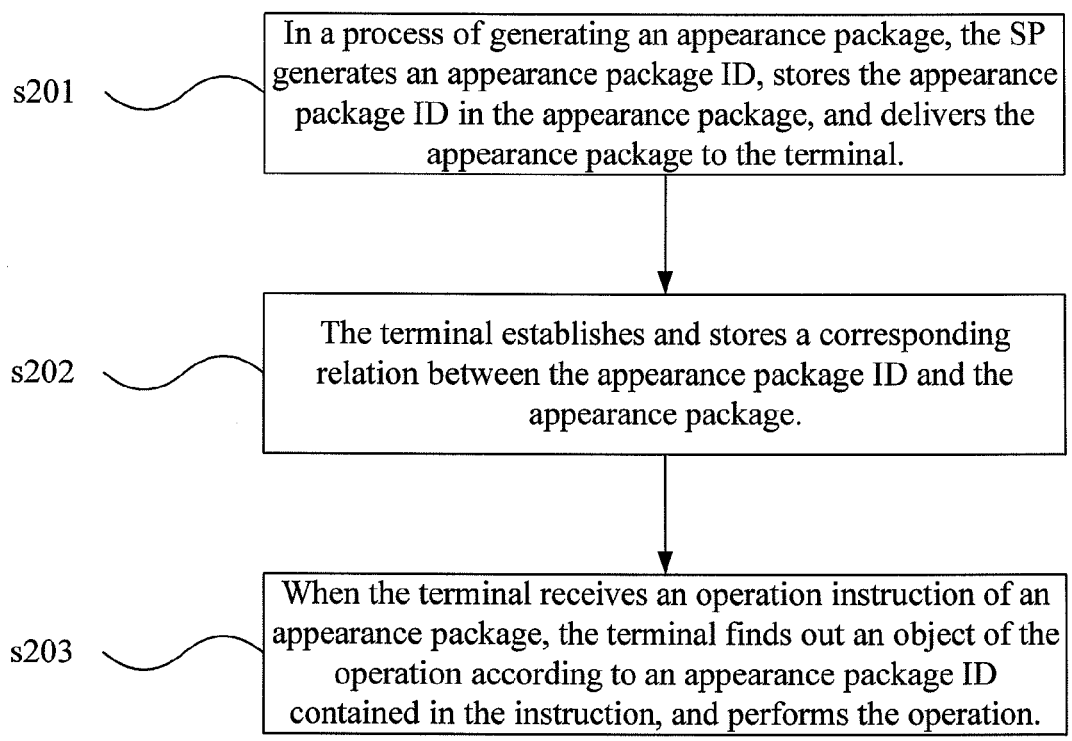
FIG. 2 is a flow chart of an appearance package management method according to a second embodiment of the present invention.

In a second embodiment of the present invention, an appearance package management method of the present invention is illustrated by taking a circumstance that the appearance package ID is generated by the SP as an example. Referring to FIG. 2, the method includes the following steps.

In step s201, in a process of generating an appearance package, the SP generates an appearance package ID, stores the appearance package ID in the appearance package, and delivers the appearance package to the terminal.

The following appearance package sent to the terminal is taken as an example.

```
<LFCPackage>
    <ID> lfc__www.cmcc.com.cn__10001</ID>
    <Element>    <!-- Background, ringing tone, and other contents contained in the appearance package -->
        <Type>Wallpaper</Type>
        <Data>DaXingAnLing.jpg</Data>
    </Element>
    ......
</LFCPackage>
```

In this case, the SP generates an appearance package ID lfc_www.cmcc.com.cn__10001 (identified with an ID field) by using a domain name www.cmcc.com.cn of the SP as an ID of the SP and adding a corresponding appearance package serial number, and sends the appearance package to the terminal.

In step s202, the terminal establishes and stores a corresponding relation between the appearance package ID and the appearance package.

According to the manners described in step s102, the terminal establishes and stores the corresponding relation between the appearance package ID and the appearance package.

In step s203, when the terminal receives an operation instruction of an appearance package, the terminal finds out an object of the operation according to an appearance package ID contained in the instruction, and performs the operation.

For the appearance package, when the terminal receives an operation instruction for an appearance package with an ID of lfc_www.cmcc.com.cn__10001, the terminal operates the appearance package.

Figure 3:
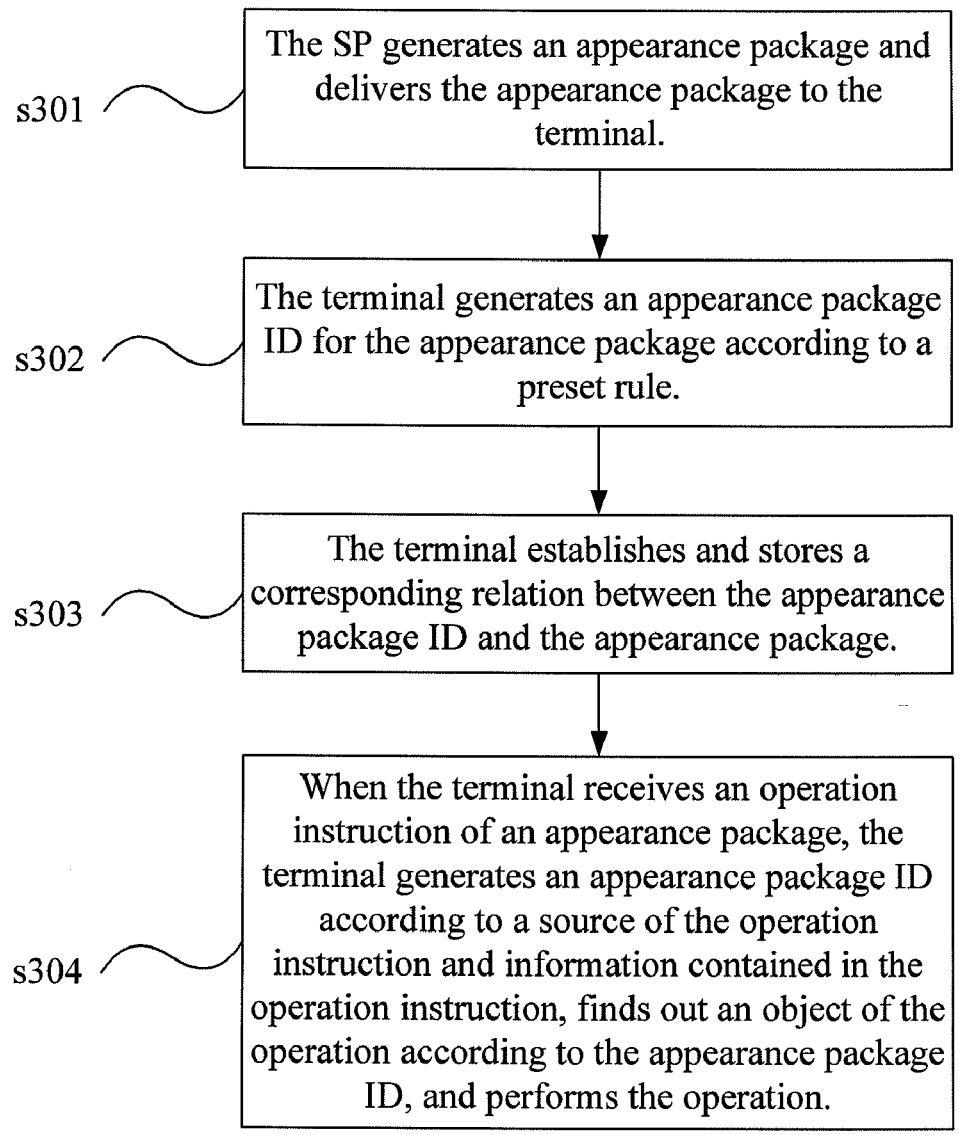
FIG. 3 is a flow chart of an appearance package management method according to a third embodiment of the present invention.

In a third embodiment of the present invention, an appearance package management method of the present invention is illustrated by taking a circumstance that the appearance package ID is generated by the terminal as an example. Referring to FIG. 3, the method includes the following steps.

In step s301, the SP generates an appearance package and delivers the appearance package to the terminal.

Different from the second embodiment, in this step, the SP does not add an appearance package ID constituted by an ID of the SP and an appearance package serial number to the appearance package.

In step s302, the terminal generates an appearance package ID for the appearance package according to a preset rule.

If the terminal finds that the appearance package does not contain any appearance package ID information after obtaining the appearance package, the terminal generates an appearance package ID according to a preset rule.

For example, the preset rule is to generate an appearance package ID according to a download path of an appearance package: assuming that the download path of the appearance package recorded by the terminal is www.cmcc.com.cn/download/lfc/10001, the path is taken as the appearance package ID of the appearance package.

For another example, the preset rule is to generate an appearance package ID according to a domain name of an SP: assuming that the terminal browses an appearance customization service provided on a webpage www.cmcc.com.cn/lfc/main, and obtains the following appearance package:

```
<LFCPackage>
    <ID>10001</ID>
        <Element>    <!-- Background, ringing tone, and other contents
contained in the appearance package -->
            <Type>Wallpaper</Type>
            <Data>DaXingAnLing.jpg</Data>
        </Element>
        ......
</LFCPackage>
``` the terminal obtains an appearance package ID according to the domain name www.cmcc.com.cn of the web site for providing the appearance customization service and an appearance package serial number 10001 in the appearance package, and sets the appearance package ID as lfc_www.cmcc.com.cn_10001.

In step s303, the terminal establishes and stores a corresponding relation between the appearance package ID and the appearance package.

The manner for establishing the corresponding relation between the appearance package ID and the appearance package is similar to that in step s102, so the details are not described herein again.

In step s304, when the terminal receives an operation instruction of an appearance package, the terminal generates an appearance package ID according to a source of the operation instruction and information contained in the operation instruction, finds out an object of the operation according to the appearance package ID, and performs the operation.

When the terminal receives an operation instruction of an appearance package, the terminal generates an appearance package ID according to a source of the operation instruction and information contained in the operation instruction, and then finds out an object of the operation by looking up the table or directly reading the directory. For example, China Mobile wants to delete a certain appearance package installed on a terminal, and sends a short message to trigger the terminal to establish a secure connection with a server. The terminal initiates HTTP Get www.cmcc.com.cn/lfc/do?39802, and accordingly, the server sends the following command to the terminal: LFC_remove 10001. Upon receiving the message, the terminal generates an appearance package ID lfc_www.cmcc.com.cn_10001 corresponding to the appearance package to be operated according to the message, finds out the appearance package, and performs the deletion operation.

In a fourth embodiment of the present invention, the application of the appearance package ID is further illustrated. Besides the deletion operation performed on the appearance package as described in the above embodiment, installation and update operations of the appearance package may also be distinguished from each other according to the appearance package ID.

Specifically, when the terminal receives an appearance package, the terminal obtains an appearance package ID therein. If the appearance package corresponding to the appearance package ID already exists on the terminal, it is determined that the operation is an update operation of the appearance package, and the appearance package is updated accordingly. Otherwise, it is determined that the operation is an installation operation of the appearance package, and the appearance package is installed accordingly.

The appearance package received by the terminal in the second embodiment is taken as an example. In this case, the terminal establishes a corresponding relation between appearance package IDs and appearance package storage paths as shown in Table 1, and stores DaXingAnLing.jpg under a directory C:\LFC\P1\Wallpaper\.

It is assumed that, the terminal subsequently receives another appearance package at a certain time point, which includes the following contents:

```
<LFCPackage>
    <ID> lfc_www.cmcc.com.cn_10001</ID>
        <Element>    <!-- Background, ringing tone, and other contents
contained in the appearance package -->
            <Type>Wallpaper</Type>
            <Data>YangHu.jpg</Data>
        </Element>
        ......
</LFCPackage>
```

An appearance package ID of the appearance package can be directly obtained by parsing the contents of the appearance package. Since the appearance package ID has been stored in Table 1, the terminal determines that the delivery of the appearance package is an update operation of the appearance package, and thus deletes the file DaXingAnLing.jpg, and stores YangHu.jpg under the directory C:\LFC\P1\Wallpaper\.

It is assumed that, the terminal further receives another appearance package at a certain time point subsequently, which includes the following contents:

```
<LFCPackage>
    <ID> lfc_www.cmcc.com.cn_10002</ID>
        <Element>    <!-- Background, ringing tone, and other contents
contained in the appearance package -->
            <Type>Wallpaper</Type>
            <Data>YangHu.jpg</Data>
        </Element>
        ......
</LFCPackage>
```

Since the appearance package ID of the appearance package is not stored in Table 1, the terminal determines that the delivery of the appearance package is an installation operation of the appearance package, and thus records the appearance package ID lfc_www.cmcc.com.cn_10002 into Table 1, and stores YangHu.jpg and other appearance contents under a directory C:\LFC\P2\Wallpaper\. At this time, two appearance packages exist in the terminal, but only one appearance package exists in the terminal after the update operation.

Through the appearance package management method provided in the above embodiments, the unique ID for the appearance package is established between the server and the terminal, so that the terminal can identify the object appearance package corresponding to the operation instruction delivered by the server. Furthermore, different operations such as installation and update operations of the appearance package can be distinguished by using the appearance package ID.

Figure 4:
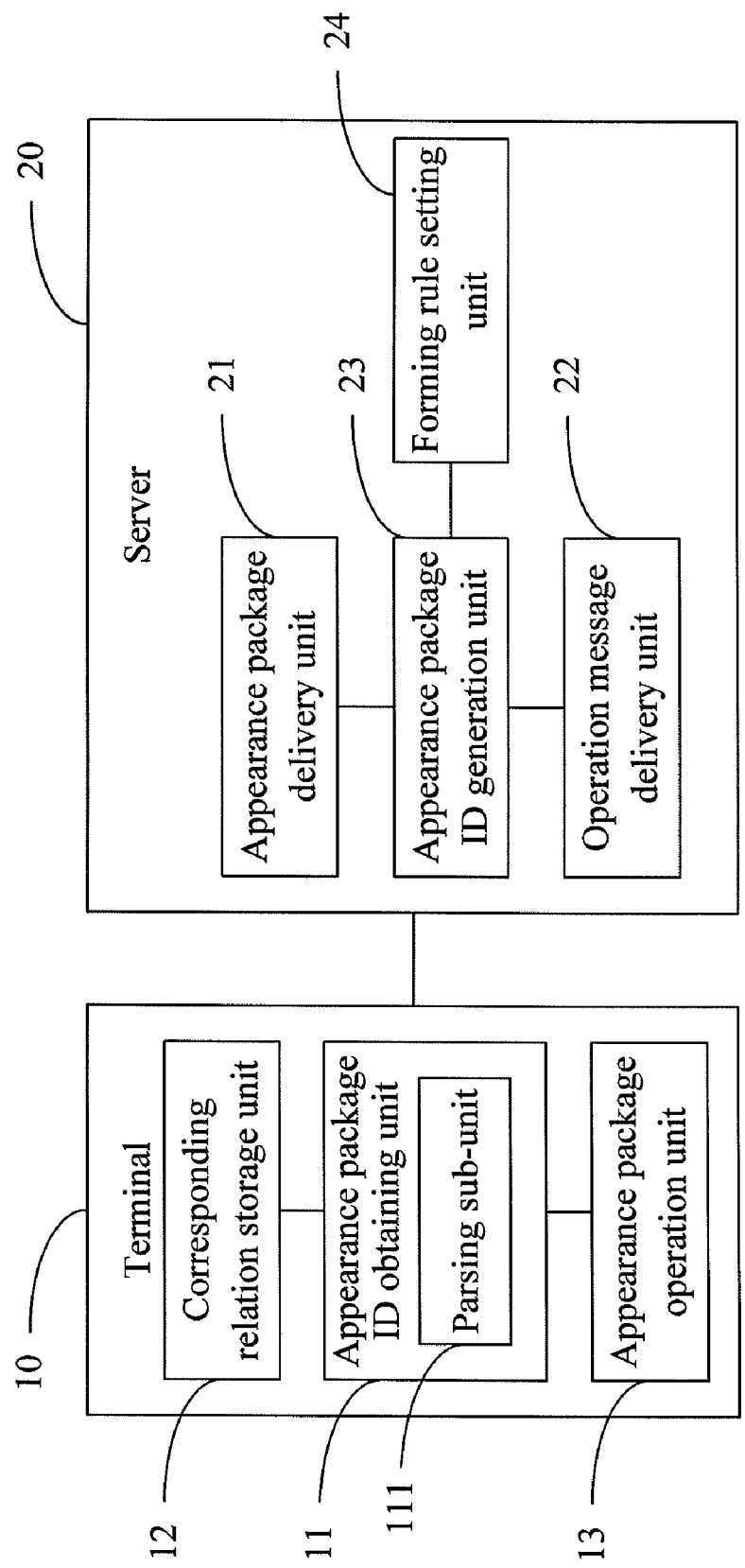
FIG. 4 is a schematic structural view of an appearance package management system according to a fifth embodiment of the present invention.

In a fifth embodiment, the present invention provides an appearance package management system, which includes a terminal 10 and a server 20, as shown in FIG. 4.

The server 20 is configured to deliver an appearance package and an operation message of an appearance package to the terminal 10. The appearance package and the operation message contain a unique appearance package ID added by the server. The terminal 10 is configured to obtain the unique appearance package ID of the appearance package delivered by the server 20, store a corresponding relation between the appearance package and the appearance package ID, receive the operation message initiated by the server 20, obtain an appearance package ID from the operation message, and operate a corresponding appearance package. The appearance package ID at least includes an ID of an SP and an appearance package serial number.

Specifically, the terminal 10 further includes an appearance package ID obtaining unit 11, a corresponding relation storage unit 12, and an appearance package operation unit 13.

The appearance package ID obtaining unit 11 is configured to obtain an appearance package ID of the appearance package sent by the server 20, and obtain an appearance package ID according to the operation message sent by the server 20. The unit further includes a parsing sub-unit 111, configured to parse the appearance package and/or the operation message sent by the server 20, so as to obtain the appearance package ID.

The corresponding relation storage unit 12 is configured to store a corresponding relation between the appearance package and the appearance package ID according to the appearance package ID obtained by the appearance package ID obtaining unit 11.

The appearance package operation unit 13 is configured to operate a corresponding appearance package according to the appearance package ID obtained by the appearance package ID obtaining unit 11 from the operation message sent by the server 20.

Specifically, the server 20 further includes an appearance package delivery unit 21, an operation message delivery unit 22, an appearance package ID generation unit 23, and a forming rule setting unit 24.

The appearance package delivery unit 21 is configured to deliver the appearance package to the terminal 10.

The operation message delivery unit 22 is configured to deliver the operation message to the terminal 10.

The appearance package ID generation unit 23 is configured to generate the appearance package ID, and add the appearance package ID to the appearance package delivered by the appearance package delivery unit 21, and to the operation message delivered by the operation message delivery unit 22.

The forming rule setting unit 24 is configured to set a forming rule for the appearance package ID generated by the appearance package ID generation unit 23, in which the appearance package ID at least includes an ID of an SP and an appearance package serial number.

Figure 5:
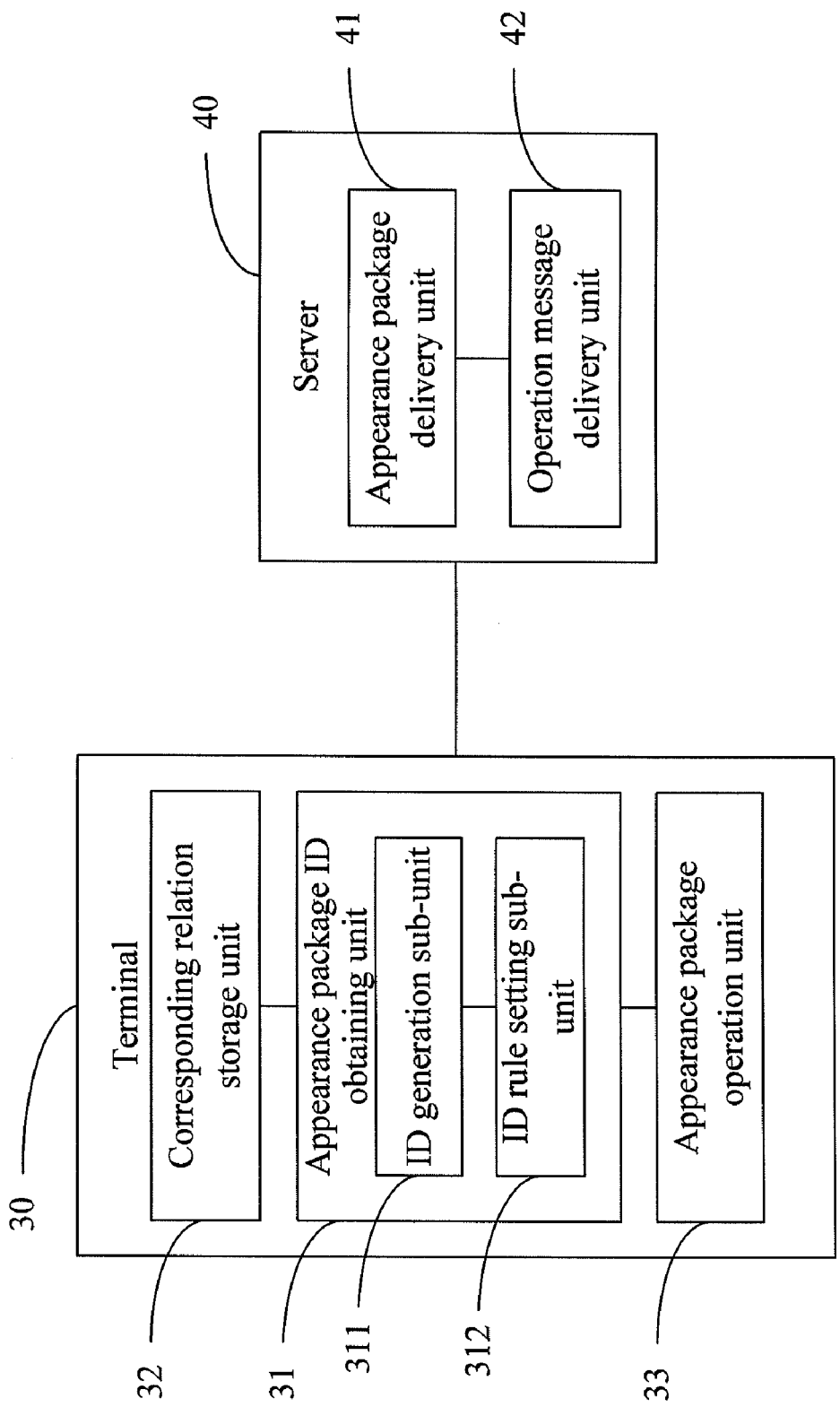
FIG. 5 is a schematic structural view of an appearance package management system according to a sixth embodiment of the present invention.

In a sixth embodiment, the present invention provides an appearance package management system, which includes a terminal 30 and a server 40, as shown in FIG. 5.

The server 40 is configured to deliver an appearance package and an operation message of an appearance package to the terminal 30. The terminal 30 is configured to generate a unique appearance package ID according to the appearance package delivered by the server 40, store a corresponding relation between the appearance package and the appearance package ID, receive the operation message initiated by the server 40, generate an appearance package ID according to the operation message, and operate a corresponding appearance package. The appearance package ID at least includes an ID of an SP and an appearance package serial number.

Specifically, the terminal 30 further includes an appearance package ID obtaining unit 31, a corresponding relation storage unit 32, and an appearance package operation unit 33.

The appearance package ID obtaining unit 31 is configured to obtain an appearance package ID of the appearance package sent by the server 40, and obtain an appearance package ID according to the operation message sent by the server 40. The unit further includes an ID generation sub-unit 311 and an ID rule setting sub-unit 312. The ID generation sub-unit 311 is configured to generate a corresponding appearance package ID according to contents of the appearance package and/or the operation message sent by the server 40. The ID rule setting sub-unit 312 is configured to set a forming rule for the appearance package ID generated by the ID generation sub-unit 311, in which the appearance package ID at least includes an ID of an SP and an appearance package serial number.

The corresponding relation storage unit 32 is configured to store a corresponding relation between the appearance package and the appearance package ID according to the appearance package ID obtained by the appearance package ID obtaining unit 31.

The appearance package operation unit 33 is configured to operate a corresponding appearance package according to the appearance package ID obtained by the appearance package ID obtaining unit 31 from the operation message sent by the server 40.

Specifically, the server 40 further includes an appearance package delivery unit 41 and an operation message delivery unit 42.

The appearance package delivery unit 41 is configured to deliver the appearance package to the terminal 30.

The operation message delivery unit 42 is configured to deliver the operation message to the terminal 30.

Through the appearance package management system and device provided in the above embodiments, the unique ID for the appearance package is established between the server and the terminal, so that the terminal can identify the object appearance package corresponding to the operation instruction delivered by the server. Furthermore, different operations such as installation and update operations of the appearance package can be distinguished by using the appearance package ID.

Through the above description of the embodiments, it is apparent to persons skilled in the art that, the present invention may be accomplished by software together with a necessary universal hardware platform, and definitely may also be accomplished by hardware, but in most cases, the present invention is preferably implemented by the former mode. Therefore, the technical solution of the present invention or the part that makes contributions to the prior art can be substantially embodied in the form of a software product. The computer software product is stored in a storage medium, and contains several instructions to instruct computer equipment (for example, a personal computer, server, or network equipment) to perform the method as described in the embodiments of the present invention.

The above descriptions are merely preferred embodiments of the present invention, but not intended to limit the protection scope of the present invention. Any modification, equivalent replacement, and improvement made without departing from the spirit and principle of the present invention shall fall within the protection scope of the present invention.

What is claimed is:

1. An appearance package management method, comprising:
    receiving an appearance package by a terminal from a server, and obtaining a unique appearance package identifier (ID) of the appearance package, wherein the appearance package comprises a plurality of appearance elements that are provided to the terminal or operated through the terminal, and the appearance elements comprise contents presented by the terminal to the users;

storing a corresponding relation between the appearance package and the unique appearance package ID;

receiving an operation message of some appearance package, and operating the appearance package corresponding to an appearance package ID obtained from the operation message according to the appearance package ID obtained from the operation message and the stored corresponding relation between the appearance package and the unique appearance package ID, wherein the unique appearance package ID comprises an ID of a service provider (SP) and an appearance package serial number;

wherein the operating the corresponding appearance package further comprises installing or updating the appearance package; and the installing or updating the appearance package further comprises:

determining whether the appearance package corresponding to the unique appearance package ID obtained from the operation message exists locally; and determining to perform an update operation on the appearance package, and updating the corresponding appearance package, if the appearance package corresponding to the unique appearance package ID obtained from the operation message exists locally; or determining to perform an installation operation on the appearance package, and installing the corresponding appearance package, if the appearance package corresponding to the appearance package ID obtained from the operation message does not exist locally.

2. The appearance package management method according to claim 1, wherein before the obtaining the unique appearance package ID of the appearance package, the method further comprises: generating, by the server, the unique appearance package ID for the appearance package according to the forming rule of the appearance package ID, adding the unique appearance package ID into the appearance package, and sending the appearance package; and the obtaining the appearance package ID of the appearance package further comprises: parsing the appearance package to obtain the unique appearance package ID carried in the appearance package.

3. The appearance package management method according to claim 1, wherein before the obtaining the unique appearance package ID of the appearance package, the method further comprises: sending, by the server, the appearance package; and the obtaining the unique appearance package ID of the appearance package further comprises:

obtaining the unique appearance package ID of the appearance package according to a preset appearance package ID forming rule.

4. The appearance package management method according to claim 1, wherein the storing the corresponding relation between the appearance package and the unique appearance package ID further comprises:

if the appearance package contains the unique appearance package ID,
  storing the appearance package; or
  establishing and storing a corresponding relation between the unique appearance package ID and an appearance package storage path; or
  storing the appearance package by taking the unique appearance package ID as a file directory.

5. The appearance package management method according to claim 1, wherein the obtaining the appearance package ID from the operation message further comprises:

parsing the operation message to obtain the unique appearance package ID added by the server into the operation message; or obtaining the unique appearance package ID based on a preset appearance package ID forming rule according to a source of the operation message and information contained in the operation message.

6. A server, applicable to manage an appearance package sent to a terminal, the server comprising:

an appearance package delivery unit, configured to deliver an appearance package to the terminal;

an operation message delivery unit, configured to deliver an operation message to the terminal;

an appearance package identifier (ID) generation unit, configured to generate a unique appearance package ID, and add the unique appearance package ID to the appearance package delivered by the appearance package delivery unit, and/or to the operation message delivered by the operation message delivery unit; and a forming rule setting unit, configured to set a forming rule for the unique appearance package ID generated by the appearance package ID generation unit, wherein the unique appearance package ID comprises an ID of a service provider (SP) and an appearance package serial number;

wherein the appearance package comprises a plurality of appearance elements that are provided to the terminal or operated through the terminal, and the appearance elements comprise contents presented by the terminal to the users.

7. A terminal, applicable to manage an appearance package of the terminal, the terminal comprising:

an appearance package identifier (ID) obtaining unit, configured to obtain a unique appearance package ID of an appearance package sent by a server, and obtain an appearance package ID from an operation message sent by the server;

a corresponding relation storage unit, configured to store a corresponding relation between the appearance package and the unique appearance package ID according to the appearance package ID obtained by the appearance package ID obtaining unit;

an appearance package operation unit, configured to operate an appearance package corresponding to the appearance package ID obtained by the appearance package ID obtaining unit from the operation message sent by the server according to the corresponding relation between the appearance package and the appearance package ID stored in the corresponding relation storage unit an ID generation sub-unit, configured to generate a corresponding appearance package ID according to contents of the appearance package and/or the operation message sent by the server; and an ID rule setting sub-unit, configured to set a forming rule for the appearance package ID generated by the ID generation sub-unit, wherein the appearance package ID comprises an ID of a service provider (SP) and an appearance package serial number.

8. The terminal according to claim 7, wherein the appearance package ID obtaining unit further comprises:

a parsing sub-unit, configured to parse the appearance package and/or the operation message sent by the server, so as to obtain the appearance package ID obtained from the operation message;

wherein the appearance package comprises a plurality of appearance elements that are provided to the terminal or operated through the terminal, and the appearance elements are contents presented by the terminal to the users.

9. The appearance package management method of claim 1 wherein a forming rule for the unique appearance package ID comprises a number range for uniquely identifying the SP plus an appearance package serial number assigned by the SP.

10. The appearance package management method of claim 1 wherein a forming rule for the unique appearance package ID comprises a domain name of the SP plus the appearance package serial number assigned by the SP.

11. The appearance package management method of claim 1 wherein a forming rule for the unique appearance package ID comprises a download path for obtaining an appearance package with a particular appearance package serial number from the SP.

\* \* \* \* \*